(12) United States Patent  (10) Patent No.: US 6,449,540 B1
Rayner  (45) Date of Patent: Sep. 10, 2002

(54) VEHICLE OPERATOR PERFORMANCE RECORDER TRIGGERED BY DETECTION OF EXTERNAL WAVES

(75) Inventor: Gary A. Rayner, San Diego, CA (US)

(73) Assignee: I-Witness, Inc., San Diego, CA (US)

( * ) Notice: Subject to any disclaimer, the term of this patent is extended or adjusted under 35 U.S.C. 154(b) by 0 days.

(21) Appl. No.: 09/669,449

(22) Filed: Sep. 25, 2000

Related U.S. Application Data

(63) Continuation-in-part of application No. 09/611,891, filed on Jul. 7, 2000, now Pat. No. 6,405,112, which is a continuation-in-part of application No. 09/405,857, filed on Sep. 24, 1999, now Pat. No. 6,389,340, which is a continuation-in-part of application No. 09/020,700, filed on Jul. 9, 1998, now abandoned.

(51) Int. Cl.[7] ................................................. G08G 1/00
(52) U.S. Cl. ............................ 701/35; 701/36; 701/29; 340/901; 340/903; 340/905; 348/143; 348/148; 381/56
(58) Field of Search ........................... 701/35, 36, 29; 348/148, 143; 340/903, 901, 426, 902, 937, 988, 989, 905, 33; 381/56; 385/116; 342/455

(56) References Cited

U.S. PATENT DOCUMENTS

| | | | |
|---|---|---|---|
| 3,992,656 A | 11/1976 | Joy | 317/147 |
| 4,271,358 A | 6/1981 | Schwarz | 250/338 |
| 4,785,474 A | 11/1988 | Bernstein et al. | 381/56 |
| 4,806,931 A | 2/1989 | Nelson | 340/907 |
| 4,945,244 A | 7/1990 | Castleman | 250/370.01 |
| 5,057,820 A | 10/1991 | Markson et al. | 340/600 |
| 5,422,543 A | 6/1995 | Weinberg | 315/129 |
| 5,495,242 A | * 2/1996 | Kick et al. | 340/902 |
| 5,495,243 A | 2/1996 | McKenna | 340/902 |
| 5,666,120 A | 9/1997 | Kline et al. | 342/20 |
| 5,680,123 A | * 10/1997 | Lee | 340/937 |
| 5,686,889 A | 11/1997 | Hillis | 340/540 |
| 5,781,145 A | 7/1998 | Williams et al. | 342/20 |
| 5,784,021 A | 7/1998 | Oliva | 342/20 |
| 6,008,723 A | * 12/1999 | Yassan | 340/438 |
| 6,011,492 A | * 1/2000 | Garesche | 340/904 |
| 6,049,079 A | 4/2000 | Noordam et al. | 250/338.1 |
| 6,111,254 A | 8/2000 | Eden | 250/338.1 |
| 6,163,338 A | * 12/2000 | Johnson et al. | 348/148 |
| 6,246,933 B1 | * 6/2001 | Bague | 701/35 |

* cited by examiner

Primary Examiner—William A. Cuchlinski, Jr.
Assistant Examiner—Tuan C To
(74) Attorney, Agent, or Firm—Calif Tervo

(57) ABSTRACT

An event recorder (10) mounted in a vehicle (20) includes one or more wave pattern detectors (200) for detection and recognition of the presence of a predetermined wave produced external the vehicle (20) and for producing a trigger signal denoting predetermined wave presence. Event recorder (10) includes sensors, including image sensor (60), sound sensor (90), location sensor (95), and vehicle performance sensors, and a capture circuit for storing sensed data signals for the time period before, during and after the wave was detected. A playback circuit (13) presents the captured data. The detected wave is produced such as by the police or fire department, or by an emergency vehicle, and is typically produced for a purpose other than being detected by wave detector (200). Wave detector (200) may be illumination wave, e.g. infrared beam or flash, detector (230), a radar detector (214), a laser kB detector (224), a flashing light detector (240), or a siren detector (250).

48 Claims, 2 Drawing Sheets

VEHICLE OPERATOR PERFORMANCE RECORDER TRIGGERED BY DETECTION OF EXTERNAL WAVES

CROSS-REFERENCE TO RELATED APPLICATIONS

This application is a continuation-in-part of co-pending application Ser. No. 09/611,891, filed: Jul. 7, 2000, now U.S. Pat. No. 6,403,112, titled VEHICLE OPERATOR PERFORMANCE MONITOR WITH ENHANCED RETRIEVAL CAPABILITIES, which is a continuation-in-part of application Ser. No. 09/405,857, filed Sep. 24, 1999, now U.S. Pat. No. 6,389,340, titled VEHICLE DATA RECORDER which is a continuation-in-part of, now abandoned, application Ser. No. 09/020,700 filed Feb. 9, 1998, titled SEQUENTIAL IMAGE STORAGE SYSTEM WITH PRE-EVENT HISTORY, which are incorporated herein in their entirety.

FIELD OF THE INVENTION

This invention relates in general to a vehicle operator performance recorder that continuously monitors a vehicle's operation and the surrounding environment and that includes a detector for detecting the presence of a predetermined wave, such as a radar, laser, light flash, or siren wave, which is produced externally the vehicle, such as by a governmental entity. The performance recorder records, for later review, automobile operating parameters provided by sensors, including audio and visual sensors, surrounding the time period immediately before, during, and after wave detection.

BACKGROUND OF THE INVENTION

It is well known that many vehicle pullovers by the police are unwarranted. Certain ethnic groups or persons fitting a certain appearance profile are unnecessarily detained in their vehicle by police.

Certain jurisdictions are notorious for trumped up traffic violations and police corruption. Tourists or foreign visitors are particularly targets of such actions as they are not in a good position to respond.

Therefore, for a person in a vehicle subjected to unwarranted police pull over or wrongly accused of a traffic violation, there has been a need for a device that records the events surrounding the alleged violation so as to prevent conviction or to show harassment.

Also, unwarranted vehicle citations may result from improper target (vehicle) identification, inaccurate radar or laser equipment calibration, inadequate training of operation, innocent operator error, or other system errors.

Therefore, there has been a need for a device that records the events and vehicle operating parameters surrounding the alleged violation so that the record can be presented as evidence to prevent conviction.

Additionally, a driver may not be aware of the proximity of governmental vehicles, such as police cars or fire trucks, or emergency vehicles, such as ambulances, indicating right-of-way by their use of sirens and flashing lights. Such lack of awareness places the driver at increased risk of harm and raises the probability of accident.

Therefore, it is additionally desirable if such a device alerts the driver of the presence of sirens or flashing lights of governmental vehicles or emergency vehicles.

SUMMARY OF THE INVENTION

The invention is an event recorder mounted in a vehicle. The event recorder includes a wave pattern detector for detection and recognition of the presence of a predetermined wave produced external the vehicle, and for producing a trigger signal denoting predetermined wave presence, and includes means for recording data, including surrounding audio and visual information, in the time period before, during and after the wave was detected.

The wave detected is typically produced by a party not associated with the vehicle, such as by a governmental entity, such as the police or fire department, or by an emergency vehicle.

The wave detected is typically produced for a purpose other than being detected by the wave detector. For example, the wave may be an infrared beam or flash for the purpose of illumination for picture taking. The wave may be a flashing light or siren for the purpose of notifying others of the presence of the police or emergency vehicle. The wave may be radar or laser produced for speed determination.

The captured information can be used as evidence of innocence of a traffic violation or of unwarranted pullover, stopping or harassment by police.

Other features and many attendant advantages of the invention will become more apparent upon a reading of the following detailed description together with the drawings wherein like reference numerals refer to like parts throughout.

DETAILED DESCRIPTION OF THE INVENTION

Figure 1:
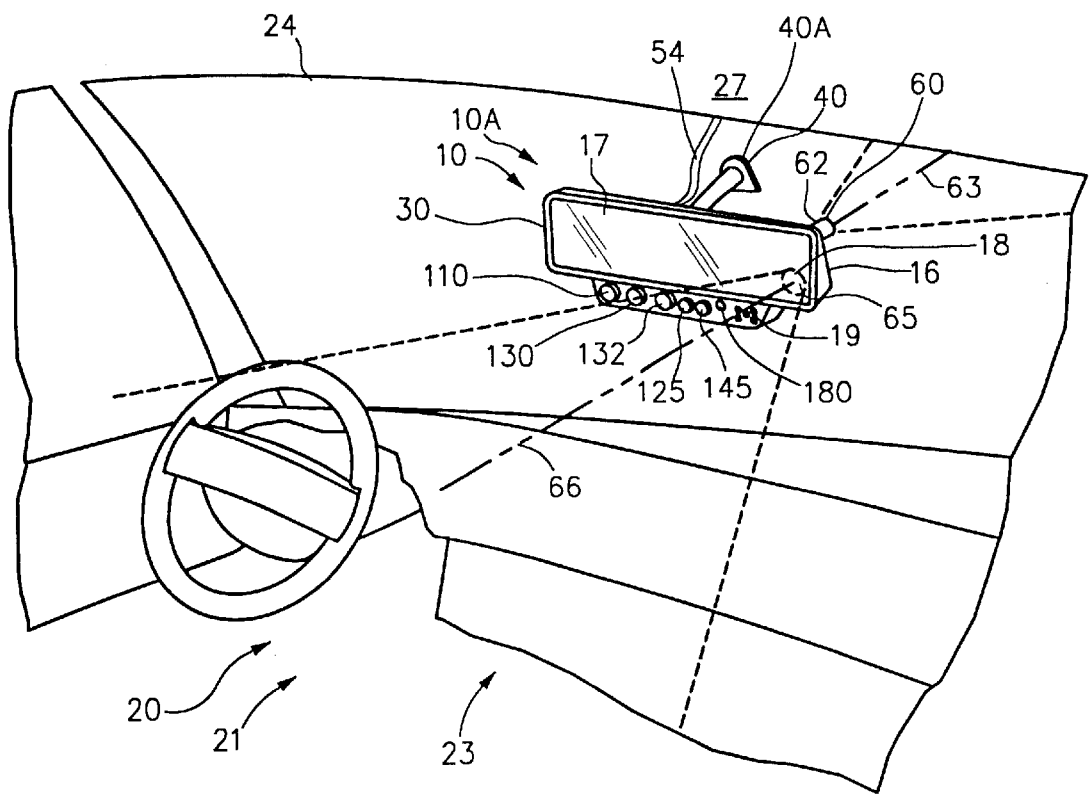
FIG. 1 is a perspective view of a first exemplary embodiment of the event recorder of the invention combined with a rear view mirror of a vehicle.

FIG. 1 is a perspective view of a first exemplary embodiment 10A of the event recorder 10 of the invention combined with a rear viewing device 16 in the cabin 23 of a vehicle 20, such as an automobile 21. Automobile 21 includes a front windshield 24 and cabin headliner 27. A conductor 54 connects recorder 10 with vehicle power and one or more input data signal lines, as will be more fully discussed later. Conductor 54 may comprise a cable of one or more electrical or optical conduits.

Recorder 10 includes a housing 30. A rear viewing device 16, including a rear viewing surface, such as mirror 17, is mounted to housing 30. Other rear viewing surfaces are contemplated, such as video screens. Mirror 17 may include an aperture, a transparent area, or a partially mirrored portion, such as half-mirrored portion 18 for transmitting light to camera 65 behind mirror 17. The front of mirror 17 or housing 30 includes an aperture 19 for communicating sound to a microphone.

A mounting means 40, such as mount 40A, mounts recorder 10 in automobile 21 such that mirror 17 is positioned in the view of an operator for rearward viewing in the manner of a conventional rear view mirror.

Figure 2:
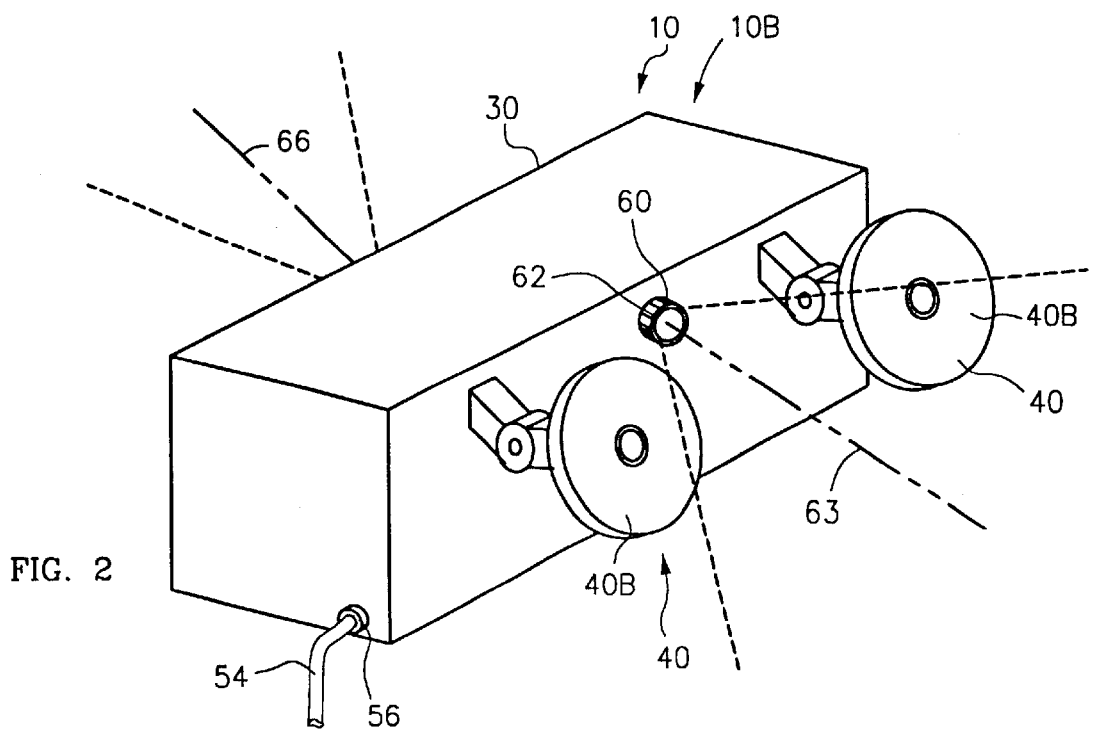
FIG. 2 is a perspective view of an second exemplary embodiment of the event recorder of the invention including suction cup mounts for mounting to a vehicle windshield.

FIG. 2 is perspective view of an second exemplary embodiment 10B of the event recorder 10 of the invention including a housing 30 and mounting means 40, such as suction cup mounts 40B for mounting to a vehicle windshield 24. A connector, such as plug 56 couples conductor 54 to recorder 10B.

Figure 3:
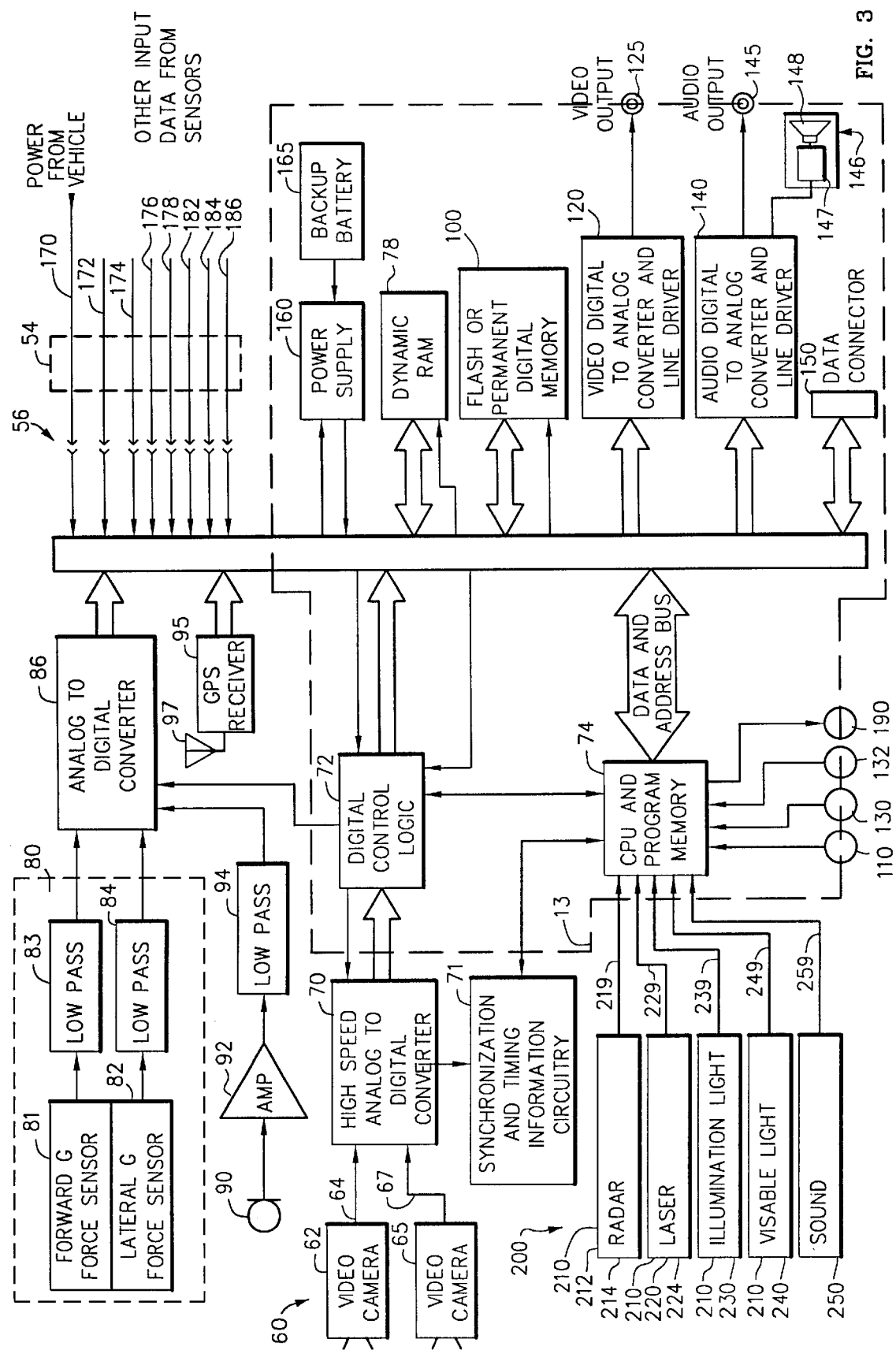
FIG. 3 is an exemplary schematic block diagram of the event recorder.

FIG. 3 is a schematic block diagram of the electronics and associated elements of vehicle recorder 10 that are contained within housing 30. Image sensor means 60, such as first image sensing means, such as forward viewing video camera 62, and second image sensing means, such as rearward viewing video camera 65, are connected to housing 30 for sensing optical images and for producing an image signal representing the sensed image. Cameras 62, 65, which are preferably charge-coupled device (CCD) or cMOS silicon sensor arrays, generate signals corresponding to video imagery. Referring briefly again to FIG. 1, camera 62 is mounted in housing 30 with its optical axis 63 directed forwardly with respect to vehicle 20, and camera 65 is mounted in housing 30 with its optical axis 66 directed rearward with respect to vehicle 20. Both axes 63 and 66 are thus generally aligned with the direction of travel of vehicle 20 and perpendicular to windshield 24. Preferably, the camera's fields-of-view cover the entire area forward of and rearward of recorder 10. The incorporation of additional cameras, such as side viewing cameras, is contemplated.

Preferably, cameras 60 capture a 360 degree view. Returning to FIG. 3, a high-speed analog-to-digital (A/D) convertor 70 digitizes the signals produced by cameras 62 and 65 on lines 64 and 67, respectively, and multiplexes them onto a digital data bus via digital control logic 72. Recorder 10 operates under the control of a central processing unit 74. Central processing unit (CPU) 74 may include a microprocessor, microcontroller, or similar device and associated random access memory and program memory. CPU 74 is programmed to perform the functions described in this specification. Because the descriptions of the functions below are sufficient to enable any person skilled in the art to which this invention relates to program CPU 74, program code and the manner in which it is programmed are not described in this specification. CPU 74 is synchronized to A/D converter 70 via synchronization and timing information circuitry 71. Digital logic 72 may compress or encrypt data or data stream from sensors.

Under control of CPU 74, digital signals representing the video imagery are stored in dynamic random-access memory (dRAM) 78 that is configured as a continuous-loop buffer. CPU 74 or associated address counter circuitry defines the continuous-loop scheme by employing wrap-around memory addressing, in which the highest memory location in a predetermined addressing sequence is adjacent or next to the lowest. Incoming digitized data signals are written to memory locations until all allocated locations have been written to, at which time the data signals stored at the next location in the sequence are overwritten with further incoming data signals.

Accelerometer circuit 80 includes means, such as a pair of accelerometers, such as forward accelerometer or G-force sensor 81 and lateral accelerometer or G-force sensor 82. G-force sensors 81,82 are coupled to another A/D converter 86 via low-pass filters 83 and 84,respectively. Although accelerometers aligned with the lateral and longitudinal axes of the vehicle are described, acceleration data can be obtained from other arrangements of non-parallel accelerometers.

Microphone 90 is coupled to A/D converter 86 via an amplifier 92 and another low-pass filter 94. Microphone 90, being integrated within enclosure 30 (see FIG. 1), is particularly sensitive to sounds occurring inside cabin 23 of vehicle 20, such as the voices of the driver and any passengers. Other sounds, such as tire screeches, warning horns, sirens and collisions are also picked up.

Under control of CPU 74, A/D converter 86 multiplexes and digitizes the signals produced by these sensors. The digitized input data are stored in volatile buffer memory, such as dRAM 78, along with the digital signals representing the visual imagery.

Global positioning system (GPS) receiver 95 receives GPS satellite signals, determines from them the geographical position of vehicle 20 and the universal time, and produces a location sensor signal and a time sensor signal therefrom representing the sensed location and sensed time. GPS receiver 95 and its antenna 97 are, like all other electronics and associated elements described above, disposed inconspicuously and securely inside housing 30. This location harmonizes with the location of recorder 10 on or near windshield 24 because radio frequency energy emanating from satellites above vehicle 20 penetrate windshield 24 more readily than metallic portions of vehicle 20.

Power may be supplied by a power supply 160, battery 165 or direct from vehicle power line 170 of vehicle conductor 54 connected to recorder 10 via coupler 56 to input conductor 54. Vehicle conductor 54 can include other conductors or lines from vehicle sensors including: speedometer signal input line 172 providing the vehicle speed from a vehicle speedometer; tachometer line 174 providing engine revolutions from a tachometer; temperature line 176 providing external and internal temperatures from temperature sensors; a distance line 178 providing trip distance from a trip odometer, a braking line 182 providing braking information from a brake sensor; and one or more engine operating parameter lines 184, 186 providing engine parameters, such as temperature, fuel flow rate, power output, etc.

CPU 74 copies data from buffer memory 78 to a more permanent non-volatile memory, such as a flash card, permanent digital memory or persistent memory 100, upon detection of a trigger signal, i.e. a data input signal at, or beyond, predetermined level representing a triggering event. For example, CPU 74 monitors the digitized signals representing the acceleration forces to which G-force sensors 81 and 82 are responsive, and if CPU 74 determines that the acceleration data exceed a predetermined threshold value indicative of a collision or other event that would warrant investigation, CPU 74 copies data from buffer memory 78 to persistent memory 100.

Memories 78 and 100 thus together define a two-tier system, in which the first tier records data in a continuous-loop fashion, and the second tier provides more permanent storage for data from the first tier in response to a triggering event. Data stored in persistent memory 100 in accordance with this scheme are not overwritten unless the entire system is reset by an operator. CPU 74 may be programmed to continue data acquisition after occurrence of the triggering event for some predetermined time interval. Thus, so long as a sufficient amount of pre-event data are retained and not over-written, additional frames of visual data or other sensory data can be gathered during and after receipt of a trigger signal and stored in memory 100 following the pre-event data.

A trigger signal, defining a triggering event, can also be produced manually by activation of a "panic" or trigger button 110 by an operator, such as the vehicle driver. Trigger button 110 may be placed on the steering wheel or other convenient location and the output coupled to vehicle conductor 54 for communication with CPU 74.

A trigger signal may be produced by each of one or more wave pattern detectors 200. Each wave pattern detector 200 detects and recognizes the presence of a predetermined wave that is produced external vehicle 20 and produces a trigger signal denoting presence of the predetermined wave.

Electromagnetic wave detector 210, such as radio frequency wave detector 212, such as speed radar detector 214 detects predetermined radar wave, such as that produced by police for vehicle speed determination, and produces a trigger signal on line 219 denoting the wave presence. Circuitry for radar detector 214 is well known in its respective art. For example U.S. Pat. No. 5,784,021 describes a radar detector and cites patents describing many radar detectors that would be suitable for inclusion in the recorder 10 of the invention.

A second electromagnetic wave detector 210, such as light wave detector 220, such a laser light detector 224 detects a predetermined laser light, such as is used by the police for vehicle speed determination, and produces a trigger signal on line 229 denoting the wave presence. Circuitry for laser detector 224 is well known in its respective art. For example U.S. Pat. Nos. 5,666,120 and 5,781,145 describe laser detectors and cite patents describing many laser (and radar) detectors that would be suitable for inclusion in the recorder 10 of the invention.

A third electromagnetic wave detector 210, such as light wave detector 220, such a picture illumination light wave detector 230 detects a predetermined light such as infrared or visible flash used for illumination in taking images, such as used by police surveillance or for unmanned police cameras monitoring red lights, and produces a trigger signal on line 239 denoting the wave presence. Circuitry for picture taking light wave detector 230 is well known in its respective art. For example U.S. Pat. Nos. 5,422,543, 5,057,820, 5,495,243, 6,111,254, 6,049,079, 5,686,889, 4,945,244 and 4,271,358 describe flash detectors and infrared detectors and cite patents describing many flash detectors and infrared detectors that would be suitable for inclusion in the recorder 10 of the invention.

A fourth electromagnetic wave detector 210, such as light wave detector 220, such as notification of presence light wave detector 240 for detection of a notification of presence light wave, such as the flashing lights used by police emergency and emergency vehicles to notify others of the presence of the emergency vehicle and the need to comply with the orders or right of way, and produces a trigger signal on line 249 denoting the wave presence. Circuitry for notification of presence light wave detector 240 is well known in its respective art. For example U.S. Pat. Nos. 5,422,543, 5,057,820 and 5,495,243 describe notification of presence light wave detectors and cite other patents describing many such detectors that would be suitable for inclusion in the recorder 10 of the invention.

Sound wave detector 250 detects and recognizes the presence of a predetermined sound wave, such as a notification of presence sound wave, such as a police or emergency vehicle siren produced to notify others of the presence of the emergency vehicle and the need to comply with the orders or right of way, and produces a trigger signal on line 259 denoting the wave presence. Circuitry for notification of presence light sound detector 250 is well known in its respective art. For example U.S. Pat. Nos. 3,992,656, 4,785, 474 and 4,806,931 describe notification of presence sound wave detectors and cite other patents describing many such detectors that would be suitable for inclusion in the recorder 10 of the invention.

Detectors 200 detect and recognize the presence of a predetermined wave produced external the vehicle for a purpose other than being detected by a detector 200. Typically the waves are produced for speed determination, image taking, or notification of presence.

The detected wave are produced external the vehicle by a party not associated with the vehicle. The party is typically a governmental entity, such as the police or fire department, or an emergency vehicle.

CPU 74 controls a display 190, such as an LCD or LED display, to provide status information such as whether recorder 10 is powered-up and otherwise operational and whether a triggering event has occurred and the nature of the triggering event.

A playback circuit 13 at least provides for downloading the sensed signals from persistent memory 100 to an output port, such as video output connector 125. Playback circuit 13 includes operator control means, such as switch buttons 130 and 132, which produce a control signal responsive to operator activation to initiate and control the retrieval of stored data. Responsive to activation of buttons 130,132 in a predetermined manner, CPU 74 causes DRAM memory 78 to be addressed in sequence and provide the stored data on the data bus. CPU 74 also controls a video digital-to-analog (D/A) converter 120 and an audio D/A converter 140, causing them to convert the data signals read from memory 78 to analog format. A video signal representing the stored video imagery data is provided at a video output connector 125. By connecting a video monitor (not shown) to connector 125, one can view the recorded imagery and other recorded data, such as time, date, g-forces, speed and engine speed, superimposed, such as in numeric or graphical format, on the video display. An audio signal representing the stored audio data is provided at an audio output connector 145. By connecting a speaker (not shown) to connector 145, one can listen to the recorded sound. A data connector 150 is also included that provides access to the data on the data bus, either directly or via suitable input/output interface circuitry (not shown). Recorder 10 can be programmed via connector 150 as well.

An enunciator 146, such as speaker module 147, including voice is simulation circuitry or recorded voice, amplifier, and speaker 148, provides aural feedback to the operator. Speaker module 147 is connected to line driver 140, and produces messages indicative of sensor signals or triggering events. For example, the operator may be warned that speed, engine RPM or g-forces are excessive.

Preferably, mechanical and electrical mounting connection for recorder 10 are both readily releasable such that recorder 10 is quickly, easily and conveniently removable from automobile 21 to a remote location for playback of captured signals. Power for playback could be provided by battery, such as internal battery 165, or by an a/c adapter. Video output 125 and audio output 145 are readily attachable to many devices, such as a television set, for playback. Switches 130 and 132 can control playback.

As an alternative to removing the entire recorder 10 from vehicle 20 to a remote location for playback, playback circuit 13 is housed in a playback module that is readily removable from housing 30 and the remainder of recorder 10 and is readily connectable to many devices, such as a personal computer (PC), for retrieving the stored data. Data connector 150 could be a USB cable, for example, and readily connect to a PC. Upon reattachment, appropriate contacts couple playback circuit 13 with the remainder of the circuitry of module 10.

As another alternative to removing the entire recorder 10 from vehicle 20 to a remote location for playback, persistent memory 100 may be housed in a device, such as card, that is readily removable from vehicle 20 to a remote location for playback on a reader compatible with the memory medium.

Suitable readers for reading most memory formats are well known in the art.

Having described the invention, it can be seen that it provides a very convenient device for acquisition, storage and retrieval of events surrounding a triggering event. The data recorded include audio, visual, location co-ordinates, G-forces, speed, engine parameters, temperatures, time, distance, and braking information. The triggering event may be speed determination, illumination for image taking, or flashing lights or sirens.

If a traffic citation was unwarranted, the driver can introduce the captured information as evidence in court to challenge the alleged violation or to exonerate himself.

The captured information can be used as evidence of unwarranted pullover, stopping or harassment by police.

The system of the invention captures information in high-risk situations, such as the proximity of a police or emergency vehicle with lights flashing or siren on.

Although specific embodiments of the invention have been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. In combination:
    a vehicle; and
    an event recorder mounted to said vehicle comprising:
        a wave pattern detector for detection and recognition of the presence of a predetermined wave produced external said vehicle, and for producing a trigger signal denoting predetermined wave presence;
        a plurality of sensors, including:
            first image sensing means for sensing optical images and for producing a first image sensor signal representing the sensed images; and
            sound sensing means for sensing sound and for producing a sound sensor signal representing the received sound;
        a persistent memory device; and
        a capture circuit connected to said sensors for receiving and capturing the sensor signals therefrom, connected to said wave pattern detector for receiving a trigger signal therefrom and for terminating capture of the sensor signals within a predetermined time period upon receipt of a trigger signal therefrom, and connected to said persistent memory device for loading the captured sensor signals therein.

2. The combination of claim 1 wherein:
    said wave pattern detector detects a predetermined electro-magnetic wave.

3. The combination of claim 1 wherein:
    said wave pattern detector detects a predetermined radio wave.

4. The combination of claim 1 wherein:
    said wave pattern detector detects a predetermined radar wave.

5. The combination of claim 1 wherein:
    said wave pattern detector detects a predetermined light wave.

6. The combination of claim 1 wherein:
    said wave pattern detector detects a predetermined light flash.

7. The combination of claim 1 wherein:
    wherein said wave pattern detector detects a predetermined laser wave.

8. The combination of claim 1 wherein:
    wherein said wave pattern detector detects a predetermined sound wave.

9. The combination of claim 1 wherein:
    wherein said wave pattern detector detects a predetermined siren wave.

10. The combination of claim 1 wherein said recorder further includes:
    playback circuit means connected to said housing including:
        an output port;
        operator control means for producing a control signal responsive to operator activation; and
        a programmed computer connected to said persistent memory, to said output port, and to said operator control means for downloading the sensor signals from said persistent memory device to said output port responsive to a control signal from said operator control means; and wherein
    at least said playback circuit and said persistent memory device are readily removable from said housing for removal from said vehicle to a remote location for playback.

11. The combination of claim 1 wherein said recorder further includes:
    playback circuit means including:
        an output port;
        operator control means for producing a control signal responsive to operator activation; and
        a programmed computer connected to said persistent memory, to said output port, and to said operator control means for downloading the sensor signals from said persistent memory device to said output port responsive to a control signal from said operator control means; and wherein
    said recorder is readily removable from said vehicle to a remote location for playback of the captured first image signal.

12. The combination of claim 1 wherein said sensors further include:
    an accelerometer for sensing acceleration and for producing an acceleration sensor signal representing the sensed acceleration.

13. The combination of claim 1 wherein said sensors further include:
    a location sensor for sensing geographical location and for producing a location sensor signal representing the sensed location.

14. The combination of claim 1 wherein said sensors further include:
    a time sensor for sensing the time and for producing a time sensor signal representing the sensed time.

15. The combination of claim 1 wherein said sensors further include:
    a speedometer for sensing the speed and for producing a speed sensor signal representing the sensed speed.

16. In combination:
    a vehicle; and
    an event recorder mounted to said vehicle comprising:
        a wave pattern detector for detection and recognition of the presence of a predetermined wave, the wave produced external said vehicle for a purpose other than being detected by said wave pattern detector, and for producing a trigger signal denoting predetermined wave presence;

a plurality of sensors, including:

first image sensing means for sensing optical images and for producing a first image sensor signal representing the sensed images;

sound sensing means for sensing sound and for producing a sound sensor signal representing the received sound;

a persistent memory device; and a capture circuit connected to said sensors for receiving and capturing the sensor signals therefrom, connected to said wave pattern detector for receiving a trigger signal therefrom and for terminating capture of the sensor signals within a predetermined time period upon receipt of a trigger signal therefrom, and connected to said persistent memory device for loading the captured sensor signals therein.

17. The combination of claim 16 wherein:

said wave pattern detector detects and recognizes the presence of a predetermined speed determination wave.

18. The combination of claim 16 wherein:

said wave pattern detector detects and recognizes the presence of a predetermined picture taking illumination wave.

19. The combination of claim 16 wherein:

said wave pattern detector detects and recognizes the presence of a predetermined notification of presence light wave.

20. The combination of claim 16 wherein:

said wave pattern detector detects and recognizes the presence of a predetermined notification of presence sound wave.

21. The combination of claim 16 wherein said sensors further include:

an accelerometer for sensing acceleration and for producing an acceleration sensor signal representing the sensed acceleration.

22. The combination of claim 16 wherein said sensors further include:

a location sensor for sensing geographical location and for producing a location sensor signal representing the sensed location.

23. The combination of claim 16 wherein said sensors further include:

a time sensor for sensing the time and for producing a time sensor signal representing the sensed time.

24. The combination of claim 16 wherein said sensors further include:

a speedometer for sensing the speed and for producing a speed sensor signal representing the sensed speed.

25. In combination:

a vehicle; and an event recorder mounted to said vehicle comprising:

a wave pattern detector for detection and recognition of the presence of a predetermined wave, the wave produced external said vehicle by a party not associated with said vehicle, and for producing a trigger signal denoting predetermined wave presence;

a plurality of sensors, including:

first image sensing means for sensing optical images and for producing a first image sensor signal representing the sensed images;

sound sensing means for sensing sound and for producing a sound sensor signal representing the received sound;

a persistent memory device; and a capture circuit connected to said sensors for receiving and capturing the sensor signals therefrom, connected to said wave pattern detector for receiving a trigger signal therefrom and for terminating capture of the sensor signals within a predetermined time period upon receipt of a trigger signal therefrom, and connected to said persistent memory device for loading the captured sensor signals therein.

26. The combination of claim 25 wherein:

the party producing the external wave is a governmental entity.

27. The combination of claim 26 wherein:

the wave is produced by the governmental entity for a purpose other than being detected by said wave pattern detector.

28. The combination of claim 26 wherein:

the wave is produced for speed determination.

29. The combination of claim 26 wherein:

the wave is produced for picture taking illumination.

30. The combination of claim 26 wherein:

the wave is produced for notification of presence.

31. The combination of claim 30 wherein:

the wave is a sound wave.

32. The combination of claim 30 wherein:

the wave is a light wave.

33. The combination of claim 25 wherein:

the party producing the external wave is an emergency vehicle.

34. The combination of claim 33 wherein:

the wave is produced by the emergency vehicle for a purpose other than being detected by said wave pattern detector.

35. The combination of claim 34 wherein:

the wave is produced for notification of presence.

36. The combination of claim 35 wherein:

the wave is a sound wave.

37. The combination of claim 35 wherein:

the wave is a light wave.

38. The combination of claim 25 wherein:

the party producing the external wave is a government agent.

39. The combination of claim 38 wherein:

the wave is produced by the government agent for a purpose other than being detected by said wave pattern detector.

40. The combination of claim 39 wherein:

the wave is produced for speed determination.

41. The combination of claim 39 wherein:

the wave is produced for picture taking illumination.

42. The combination of claim 39 wherein:

the wave is produced for notification of presence.

43. The combination of claim 42 wherein:

the wave is a sound wave.

44. The combination of claim 42 wherein:

the wave is a light wave.

45. The combination of claim 25 wherein said sensors further include:
an accelerometer for sensing acceleration and for producing an acceleration sensor signal representing the sensed acceleration.

46. The combination of claim 25 wherein said sensors further include:
a location sensor for sensing geographical location and for producing a location sensor signal representing the sensed location.

47. The combination of claim 25 wherein said sensors further include:
a time sensor for sensing the time and for producing a time sensor signal representing the sensed time.

48. The combination of claim 25 wherein said sensors further include:
a speedometer for sensing the speed and for producing a speed sensor signal representing the sensed speed.

* * * * *